April 22, 1941. F. G. CREED 2,238,974
FLOATING STRUCTURE, STATION, AND SEADROME
Filed Feb. 11, 1939 6 Sheets-Sheet 1

Frederick George Creed
INVENTOR
his ATT'Y.

April 22, 1941.  F. G. CREED  2,238,974

FLOATING STRUCTURE, STATION, AND SEADROME

Filed Feb. 11, 1939  6 Sheets-Sheet 2

Frederick George Creed
INVENTOR

By Otto Munk
his ATTY.

Frederick George Creed
INVENTOR

By Otto Munk
his ATTY.

Frederick George Creed
INVENTOR
his ATT'Y.

April 22, 1941.　　　　　F. G. CREED　　　　　2,238,974
FLOATING STRUCTURE, STATION, AND SEADROME
Filed Feb. 11, 1939　　　　6 Sheets-Sheet 5

Frederick George Creed
INVENTOR

April 22, 1941.   F. G. CREED   2,238,974
FLOATING STRUCTURE, STATION, AND SEADROME
Filed Feb. 11, 1939   6 Sheets-Sheet 6

Frederick George Creed
INVENTOR
By his ATTY.

Patented Apr. 22, 1941

2,238,974

UNITED STATES PATENT OFFICE 2,238,974

FLOATING STRUCTURE, STATION, AND SEADROME

Frederick George Creed, Croydon, England, assignor to Floating Stations Limited, London, England, a British company Application February 11, 1939, Serial No. 255,832
In Great Britain August 30, 1938

5 Claims. (Cl. 114—43.5)

This invention relates to floating stations or structures intended to be anchored in deep water and adapted to serve various purposes, such as a landing stage for aircraft, a refuelling station, a cable relay station or other purpose, and intended to contain machinery, apparatus and material for giving aid to air or water craft and/or direction indicating apparatus and other apparatus, such as a visual or radio beacon.

Now, such a floating structure, particularly if it is intended as a landing stage for aircraft, must be substantially non-responsive to wave motion, i. e. must be substantially immobile even in rough water.

It is known that a partially submerged body suffers change of buoyancy due to the passage of a wave and that a fully submerged body does not change its buoyancy. It might be assumed, therefore, that to obtain an immobile floating structure it is only necessary to support it on a fully submerged body having the necessary buoyancy. Such a structure would not be possible as it would not be stable. Stability could be obtained by counter-weighting the submerged body, but here the stability would be feeble and quite small changes of weight would cause an alteration of level, i. e. an increased load would submerge the structure to a greater extent so making the structure impractical.

Stability could also be obtained by connecting the superstructure with the submerged buoyant body by a number of bodies—of relatively large water surface area—subject to change of buoyancy sufficient to counteract any tendency for the structure to turn turtle. This possibility even when combined with that previously suggested is not practical due to the immense strains which would be set up by waves and the high cost of building such a massive structure.

I have already succeeded in overcoming these two main disadvantages of feeble stability and poor supporting power, and in the specification of my U. S. A. Patent No. 2,107,886 I have described a floating structure which is supported at each of three points near the extremities of the superstructure by a closed elongated cylinder which extends down into deep calm water. Due to the triangular relative positioning of the three cylinders, I am able to obtain complete stability and a high degree of buoyancy as well as negligible movement in a vertical direction, as the cylinders are only affected by sub-surface waves which, as is recognised, are only a fraction of the surface waves; their height decreasing as the depth increases. Thus, a surface wave 30 ft. high produces at about 200 ft. depth a sub-surface wave of only about 3½ ft. which is the approximate amount of movement imparted to the cylinders. This structure is, therefore, particularly suitable for use as a landing stage for aeroplanes and other services, but it suffers some disadvantage due to the immense pressures of the water acting on deeply submerged portions of the three closed supporting and stabilizing cylinders. Furthermore, it is necessary, on account of the great extent of the structure and due to the buoyancy being obtained from three remote points, that the structure be very strongly constructed, employing massive constituent parts which are expensive to produce and build and practically impossible to launch in the usual way.

As a result of my experiments, I have found that the height of a sub-surface wave is a measure of the change of head which occasions a change of static pressure and that it is this change of static pressure more than any vertical movement of the water which reacts on the cylinders to produce changes of buoyancy, the dynamic effect of this vertical movement being negligible.

Now, the chief objects of the present invention are to provide an improved floating structure, which has all the advantages of the structure described in my said prior patent without its disadvantages, whilst at the same time achieving an even greater degree of immobility and stability, which may be more simply constructed and of less massive material and which may be assembled on still water so avoiding launching difficulties.

A further object is to provide an arrangement such that the structure may be, at least in part, renovated or repaired, whilst still anchored in its position of use.

A still further object of the invention is to construct the apparatus of a number of uniform units so reducing the cost of manufacture and simplifying construction and repair operations.

Yet another object of the invention is to raise the centre of buoyancy and conversely to lower the centre of gravity by delivering the thrust of the sub-surface wave at a point near the surface of the water, whilst another object is to interpose an inert mass and an elastic body in the line of thrust, thus minimizing the reaction.

With these and other objects in view, the floating structure according to the present invention comprises a superstructure supported above water level out of reach of waves by evenly distributed unchangeable buoyancy body or bodies and stabilised near the extremities of the superstructure at three points triangularly arranged by bodies or groups of bodies of changeable buoyancy affected only by sub-surface wave pressures at their lower ends.

The superstructure conveniently in the form of a deck or a plurality of decks is carried by totally submerged buoyancy member or members or framework distributed substantially over the length and breadth thereof whilst it is stabilised by three triangularly arranged vertical cylindrical bodies extending deeply into the water and open at their lower ends so that the water (constituting an inert mass) may rise therein to a substantial extent as may be determined by the volume of air (elastic body) trapped at the closed upper end of the cylinder or by a transverse wall or partition provided for that purpose. In the latter case also an amount of air may be trapped below the transverse wall or partition in order to obtain a cushioning effect due to the elasticity of the air.

The buoyancy member or members or framework extend below and desirably throughout substantially the length and breadth of the superstructure whilst the stabilising cylinders are positioned at or near the extreme points of the structure and extend well above water level. The buoyancy member or members or framework are extended up to support the superstructure and the whole assembly is stayed to obtain rigidity. The extensions desirably suffer only slight or no change of buoyancy due to the passage of waves and, according to a further feature of the invention, the extension members are in the neighbourhood of the surface of the water of diminishing diameter so that increased buoyancy, due to the passage of a wave, is offset or substantially nullified by the increased weight of water acting on the particular member.

The stabilising cylinders are filled with water up to approximately or to somewhat below the normal water level, as may be determined either by the volume of air trapped and compressed at the tops of the cylinders or as determined by the transverse walls or partitions previously mentioned. According to a still further feature of the invention, the cross-sectional area or diameter of the stabilising cylinders in the neighbourhood of the normal water level diminishes in order that any increase in buoyancy due to the passage of a wave may be offset by the increased weight of water acting on the cylinder.

In order that the invention may be clearly understood and readily carried into effect, constructional embodiments thereof are hereinafter more fully described by way of example with reference to the accompanying more or less diagrammatic drawings, in which:—

Referring now to the said drawings, in which like parts bear like reference numerals, and in particular to Figures 1 to 5, the superstructure desirably takes the form of a platform or deck 1 of T or triangular shape of any convenient dimensions, which may further be provided with an under-deck 2 and intermediate deck 3. The deck is suitably strengthened or the several decks, if there are more than one, assembled by a lattice or other convenient framework (not shown). The superstructure, however, forms no material part of the invention and may be constructed or adapted as required to suit the particular purpose for which the floating station is intended. As illustrated, the upper deck 1 is intended as a landing stage for aircraft, which may be removed down the inclined slope 1¹ to a lower deck or decks. Rising platforms 1² may be provided for lifting aeroplanes or the like from the lower deck to the upper deck and in the deck space provided there may be arranged workshops, living rooms, stores and various equipment necessary for the functioning of the station and for the particular purpose for which it is intended.

Below the deck or the lowest deck, if there are more than one, are arranged a number of depending supporting columns 4 which terminate at their lower ends in hollow junction boxes 30 to which are conveniently connected hollow buoyancy bodies 5, and auxiliary buoyancy bodies 5¹, 5² to form a buoyant framework which extends substantially over the length and breadth of the superstructure. The depending columns preferably do not suffer serious change of buoyancy due to the passage of a wave and to this end may either be solid members or members of too small a diameter to suffer any change of buoyancy effective on the deck they support.

As illustrated (Figure 5), the supporting columns 4 are of diminishing cross-sectional area or diameter in the region of the normal level of the water. Thus, any tendency to move upward due to the increased buoyancy on passage of a wave is offset or nullified by the increased downward pressure, or weight, of the water acting on the now submerged portion of the inclined surface.

Figure 5:
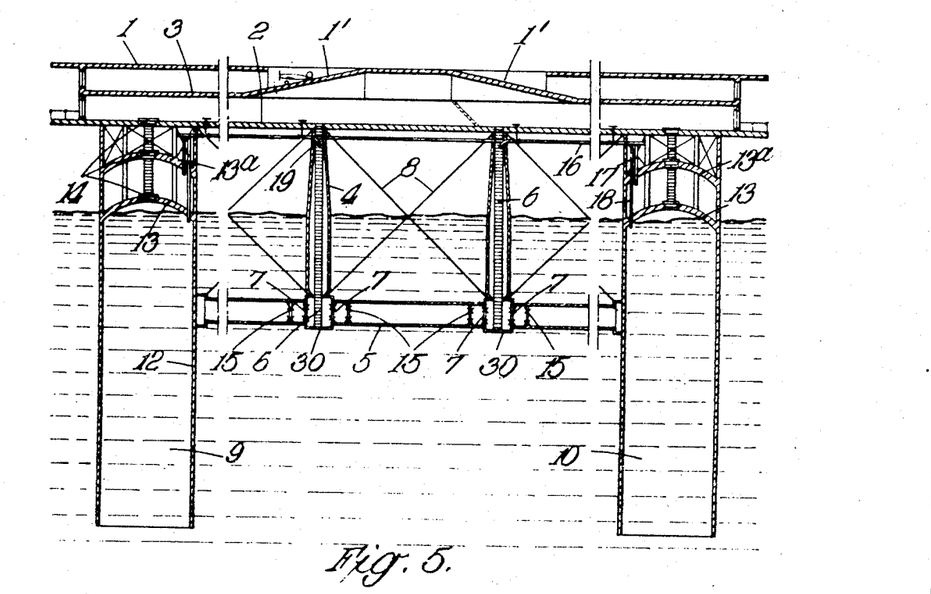
Figure 5 is a section on an enlarged scale taken along the line V—V of Figure 2.

The buoyancy bodies 5, 5¹, 5² conveniently comprise tubular members closed off at or near each end by a water-tight bulk-head and water-tight door 15. Similar water-tight doors 7 are provided in the junction boxes 30 and leading to the respective sections of the buoyancy members 5. Thus, not only may any one section be closed off should it become flooded, but that section may be isolated for replacement or repair. Access may be obtained to the various sections through the doors in the bulk-heads which may be reached by means of ladders 6 arranged in one or more of the supporting columns 4.

Figures 1, 2:
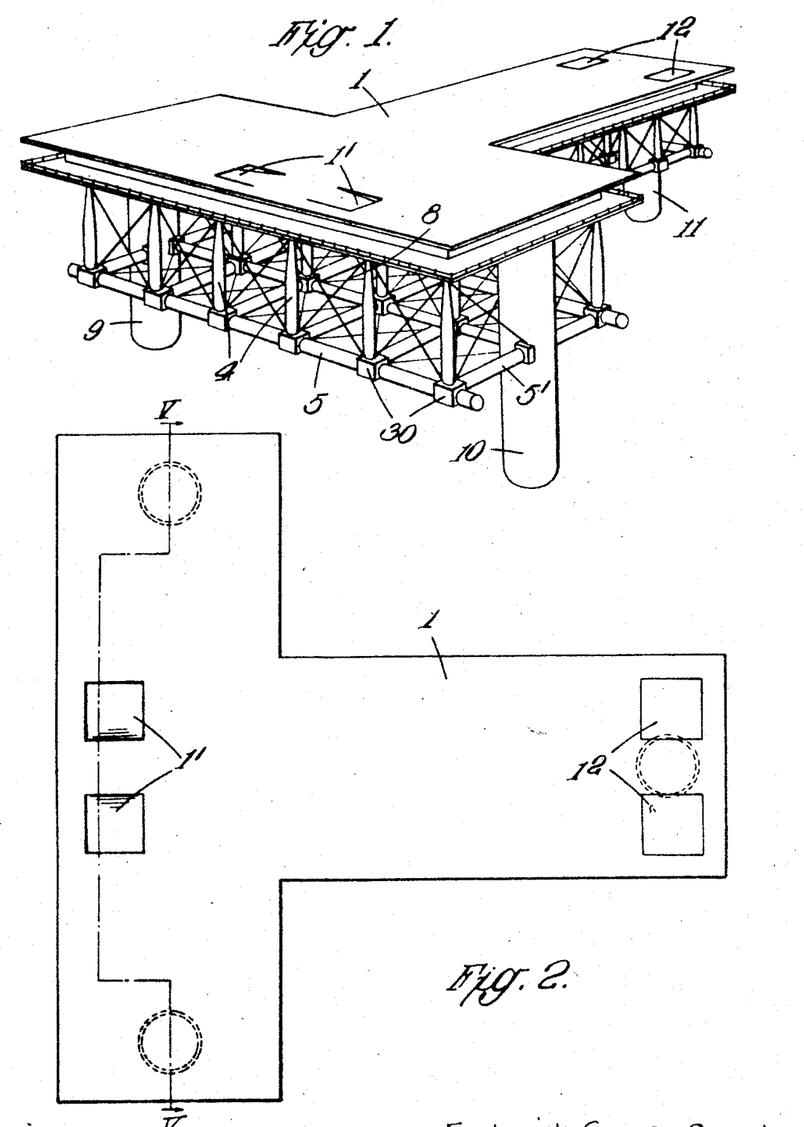
Figure 1 is a perspective view of one form of floating structure.
Figure 2 is a plan view thereof.
Figure 3:
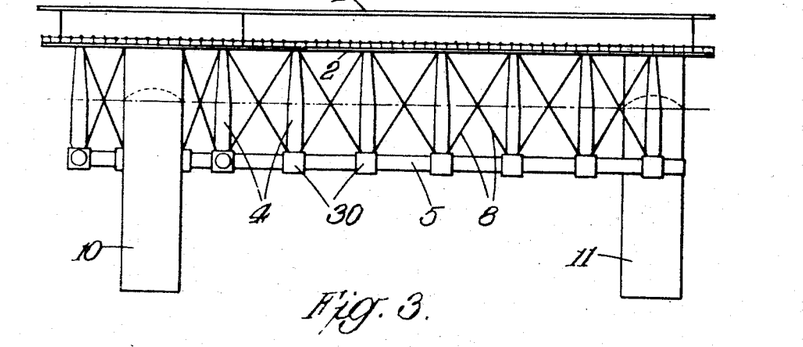
Figure 3 is a side elevation.
Figure 4:
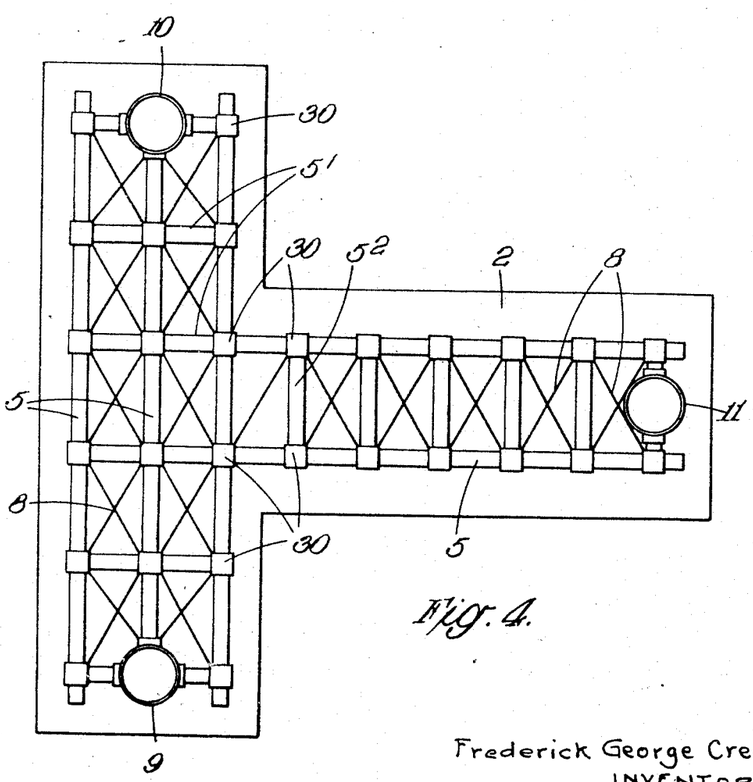
Figure 4 is an underplan view.

As may be seen from Figure 4, there are three rows of buoyancy bodies 5 supporting the main width of the deck and two rows of buoyancy bodies 5 supporting the main length thereof. The buoyant deck-supporting bodies are evenly distributed over the length and breadth of the deck so that no part is unduly strained, the rigidity of the whole structure being increased by means of stays 8. As the buoyancy bodies 5 are entirely submerged they do not suffer change of buoyancy, but the structure would not be stable. To stabilise the structure three stabilising columns 9, 10 and 11 are situated near the extreme points of the superstructure into which their ends are conveniently built. The rows of buoyancy members or intermediate buoyancy members or some of them conveniently terminate at the adjacent cylinder.

Each stabilising cylinder comprises a tube of large cross-section having parallel walls 12 designed to provide a smooth uninterrupted surface to the surrounding water so that the cross-section is desirably circular. The stabilising cylinders, which are arranged at or near the extremities of the triangular or T shape superstructure, extend deeply into the water to an extent of at least some 200 ft. (in the ocean) and are allowed to contain a column of water up to approximately the normal water level which may be determined either by an amount of air enclosed in the sealed upper end of the tube or by a transverse wall or partition 13 below which there may be trapped an amount of air to obtain a cushioning effect. The transverse wall 13 may be desirably curved, as may be seen from Figure 5, and above the same may be arranged a second transverse wall or partition 13a which may be curved or flat. Access to the space between the transverse walls 13 and 13a and to the space below the wall 13 may be had through suitable trap doors 14.

The cylinders or tubes, due to their large cross-section, and the air enclosed at the top thereof, are themselves inherently stable in a vertical sense, i. e. they will individually normally tend to float vertically and, due to their triangular arrangement, give stability to the superstructure. They are not intended to support the weight of the superstructure but to cooperate with the fully submerged buoyancy members 5 which do support the superstructure and do not suffer change of buoyancy. The changes of buoyancy to which the cylinders are liable give the desired stability to the structure, but, due to the depth to which they extend into the water and due to the column of water enclosed, the only change of buoyancy is due to the small vertical component of the sub-surface wave pressure at the depth of the lower extremity of the cylinders which is only a mere fraction of that of the surface wave. As wave pressures cannot act through the walls of the cylinders, only the pressures of the sub-surface waves acting on the inert columns of water enclosed in the cylinders are conveyed thereby to the tops of the cylinders, or the transverse walls when such are provided. Where, however, the height of the column of water in the cylinder is determined by a volume of air trapped at the top thereof or there is a volume of air trapped below the transverse wall, that volume of air has to be further compressed before the pressures become effective on the cylinders so that the elasticity of the volume of air damps the movements of the columns of water.

The trim of the structure may be altered by increasing or decreasing the amount of air in one or more of the cylinders 9, 10 and 11 and the height of the deck above the water may be altered by varying the amount of air in all the cylinders. To this end suitable air compressors are provided and compressed air is taken through pipes 16, 17 and 18, of which the last mentioned leads below the transverse wall 13 when such is provided. The main pipe 16 also leads to the columns 4 through branches 19, the arrangement being such that compressed air may be stored in one or more of the columns 4 until required for driving out some of the water in cylinders 9, 10 and 11. Thus, when it is desired to inspect or replace, repair or repaint the submerged upper portions of the stabilising cylinders 9, 10 and 11 and/or the buoyancy bodies 5, $5^1$, $5^2$, this may be effected in calm weather by forcing air or more air into the tops of the cylinders or below the transverse partitions to elevate the whole structure so that the buoyancy bodies 5, $5^1$, $5^2$ may be brought above sea level. This is a great advantage as it is not necessary to tow the structure to land for repair or replacement of damaged sections; the whole supporting and stabilising of the structure being obtained during this time by the three columns.

Figure 6:
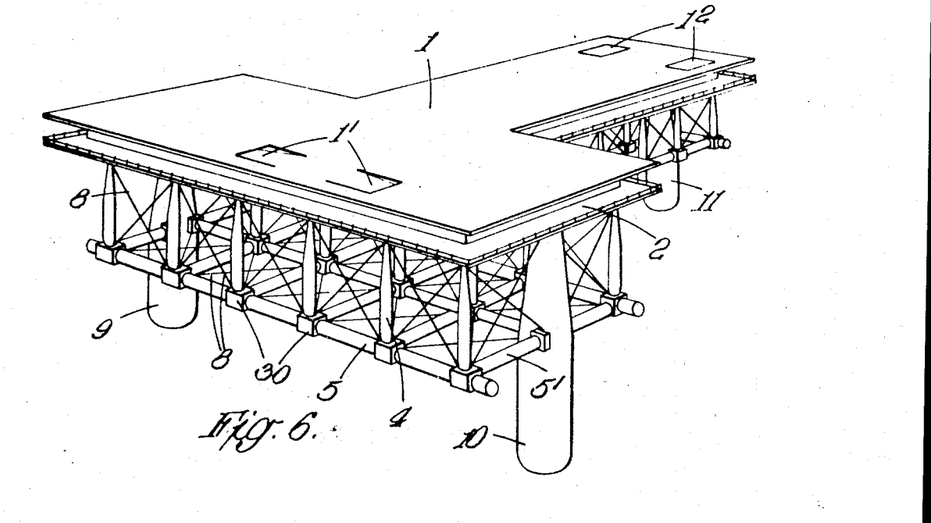
Figure 6 is a perspective view of another form of floating structure.
Figure 7:
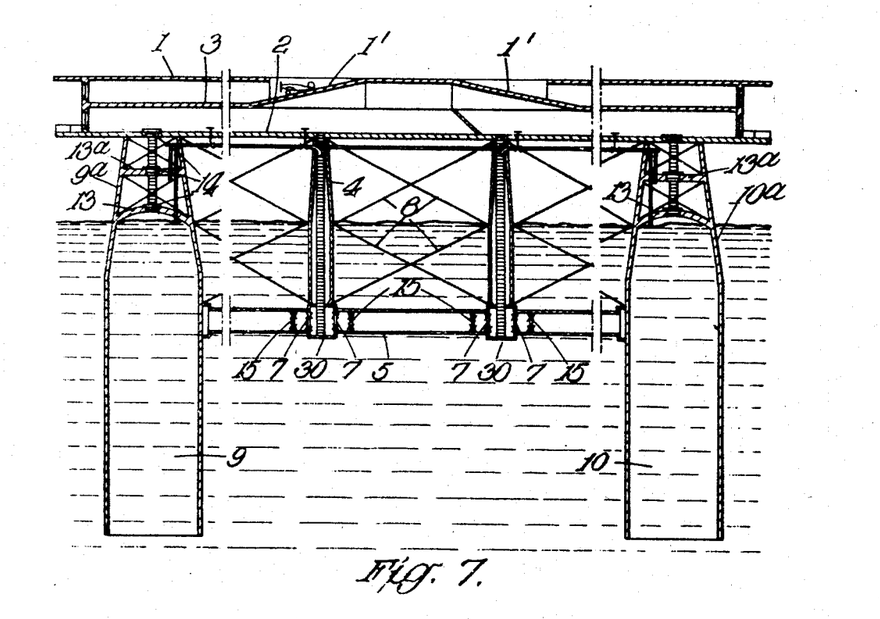
Figure 7 is a view similar to Figure 5 but showing the structure illustrated in Figure 6.
Figure 8:
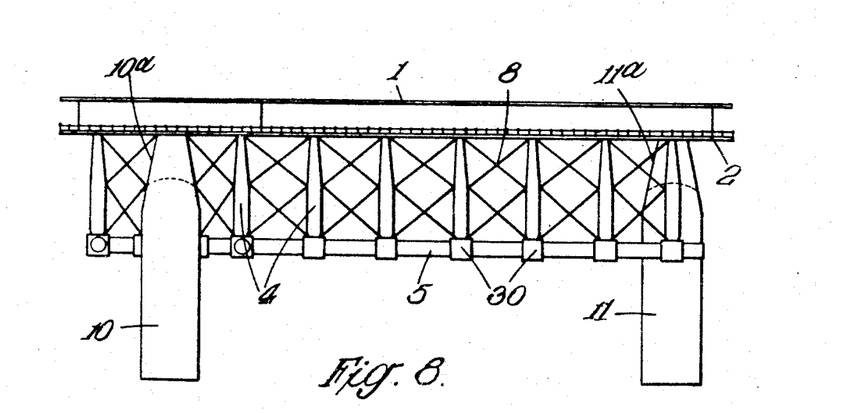
Figure 8 is a side elevation of the structure shown in Figure 6.

According to a modification illustrated in Figures 6, 7 and 8, the columns 9, 10 and 11, whilst having the same general construction, are—in the neighborhood of the normal water lever—of decreasing cross-sectional area or diameter to provide inclined surfaces $9a$, $10a$, $11a$. Due to the inclined surfaces, the respective columns do not suffer material change of buoyancy due to the passage of a wave whilst maintaining their capability of changing of buoyancy necessary to stabilise the structure, since—as in the case of the smaller supporting columns 4—on passage of a wave the upward component is offset by the downward component due to the increased weight of water acting on the sloping surface.

Figure 9:
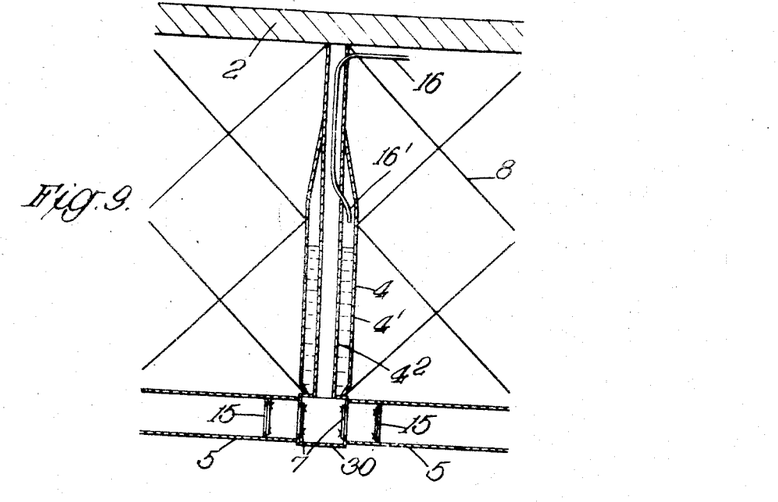
Figure 9 is a sectional elevation of another form of supporting column.

In Figure 9 is shown another modification of the column 4 which in this case is constructed with two walls $4^1$, $4^2$ which form two concentric chambers, of which one or other and preferably the outer may be flooded in order to provide a variable degree of buoyancy, the buoyancy being increased when the water is expelled and decreased when water or more water is introduced into the chamber. The pipe 16 has a lead $16^1$ for conveying compressed air into the chamber.

Figure 10:
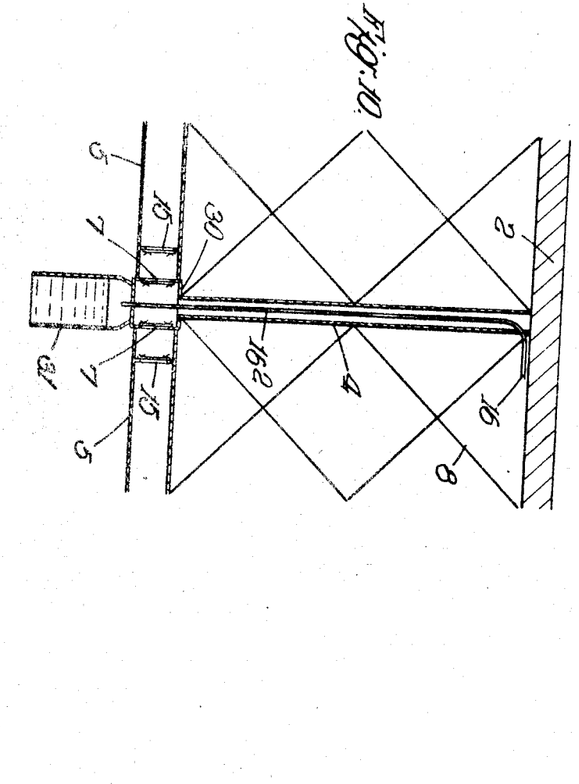
Figure 10 is a sectional elevation of yet another form of supporting column showing also additional supporting means.

In Figure 10 is shown a simple column 4 of small diameter which may be substituted for the wider column having the portion of decreasing cross-section or diameter. As may also be seen from Figure 10, there may be arranged below the junction box 30 an open-ended tube 31 into which the surrounding water has free entry. This tube serves to assist in supporting the superstructure when it is desired to elevate the submerged buoyant bodies out of the water as previously described, these members assisting the stabilising columns in carrying out this operation. For this purpose, the main air pipe 16 has a branch $16^2$ extending through the column 4, junction box 30 and terminating near the top of the tube 31, the water being expelled by means of compressed air introduced into the tube 31 by the pipe $16^2$ which now becomes buoyant and supports part of the weight. If all or the greater number of the junction boxes are provided with this device, the additional support will be evenly distributed.

Figure 12:
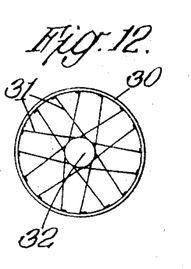
Figure 12 is a section taken on the line X—X of Figure 11.
Figure 13:
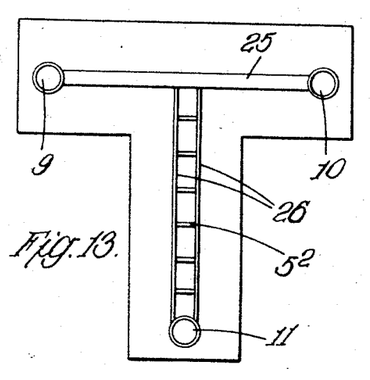
Figures 13, 14, 15 and 16 show underplan views of the structure showing different arrangements of the fully submerged buoyancy.
Figure 14:
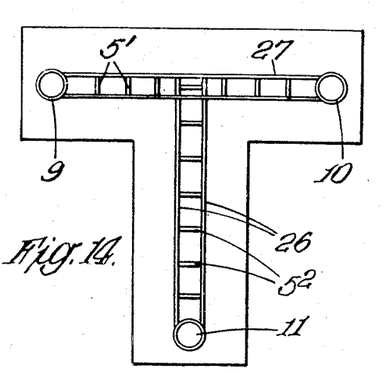
Figure 15:
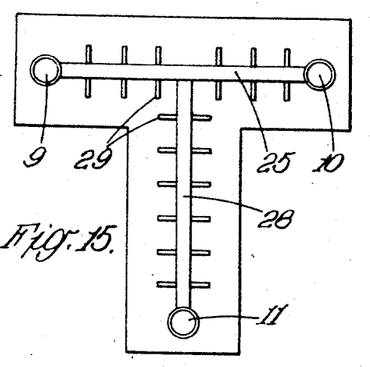
Figure 16:
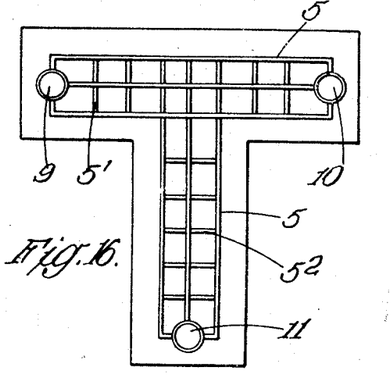

It will be appreciated that various arrangements of buoyancy bodies may be resorted to without affecting the invention. In Figure 13 the main breadth of the superstructure is supported by a singular tubular buoyancy body 25 of increased cross-section, there being in this case two parallel rows of buoyancy bodies 26 for supporting the main length of the structure, whilst in Figure 14 there are two rows of buoyancy bodies 27 with a similar two rows of buoyancy bodies 26 for supporting the main length where necessary or desirable, there being provided auxiliary buoyancy bodies 5¹, 5². In the arrangement according to Figure 15, the main breadth of the structure is supported by a single buoyancy member 25 of larger diameter and the main length of the structure is similarly supported by a similar buoyancy member 28. In this case the buoyancy bodies are connected to the deck or lowermost deck by a plurality of members 29 which diverge from the buoyancy bodies. In Figure 12 three rows of buoyancy bodies 5 with auxiliary buoyancy bodies 5¹, 5² support the superstructure.

Figure 17:
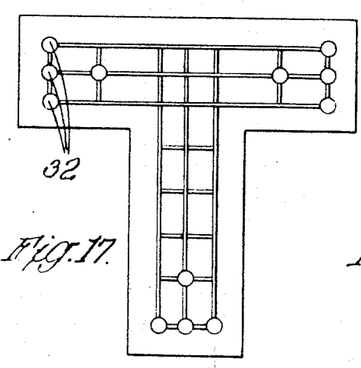
Figure 17 is an underplan view showing a modification of the stabilising cylinders.

In addition to the various arrangements of buoyancy bodies just described, variations may also be made in the stabilising columns. Thus, instead of a single cylinder of large diameter the same may be replaced as illustrated in Figure 17 by a plurality of smaller cylinders 32 of which there may be two, three or more for example, four, as illustrated, each group being arranged at one extremity of the superstructure. With this arrangement of stabilising columns there may be employed any of the arrangement of buoyancy bodies previously described, although it is preferred to employ the three runs of buoyancy bodies as shown in the drawings.

Figure 11:
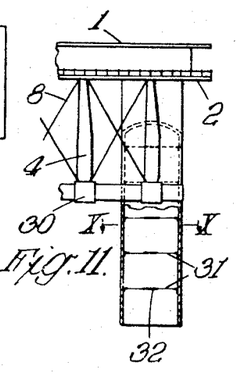
Figure 11 is a part sectional elevation through one of the stabilisers showing the strengthening thereof.

As the stabilising cylinders are water-filled they are not subjected to substantial compressive stresses and they need not be unduly massive. Where, however, it is desired to strengthen the wall, they may, as illustrated in Figures 11 and 12, be provided with a plurality of flanges 30 from which extend a number of strands or spokes 31 which are taken to a central annular plate or ring 32 and suitably strained. This form of strengthening may be applied to both forms of stabilising columns.

As in my prior Patent No. 2,107,886, the main superstructure may be provided with an extension superstructure which is now supported by a row or rows of fully submerged buoyancy bodies and is stabilised by a single column, as previously described, which is disposed triangularly with respect to two of the cylinders of the main structure. The extension is desirably hingedly connected to the main structure.

The structure as a whole may be adapted in a variety of ways to suit requirements and the invention is not limited to any precise construction as the details may be altered without departing from the basic principles.

By virtue of the new structure, several important new effects are produced, among the more important of which are the following:

(1) The upward thrust of the sub-surface wave pressures upon the stabilisers is now against the tops or partitions thereof and not upon the bottom of the cylinder as before. From this it follows that while the changes of static pressure due to surface waves are only such as take place at the bottom of the stabiliser, (i. e. such as are due to the changes of head of the undersurface wave at that depth), yet the effects of these changes of pressure are delivered at a much higher point. The positions of the centre of gravity and of the centre of buoyancy of the whole structure are thus very favourably affected.

(2) Since the pressure of the water is the same both within and without the cylinders they can be made of much lighter material and do not require much internal bracing or strengthening. The transverse partition when such is provided is near the surface level of the water and consequently under lower pressure so that it can also be of light construction.

(3) The bottom rim of the stabilisers can, if desired, be carried to a great depth at small relative cost, so as to secure maximum stability and minimum of movement in stormy weather.

(4) Since the submerged buoyant bodies or framework together with the columns and braces which connect the same with the deck and other unsubmerged portions of the structure, form a very deep girder of great strength and rigidity, the whole structure can be made of maximum strength and lightness; and the deck, being uniformly supported, is free from unequal stresses.

(5) The lower members of the submerged framework which, in a bridge would rest on piers and would be the tension members, are, in this structure, under neither compression nor tension, being fully supported at all points by its own buoyancy. The deck or decks, which would form the compression member, are similarly normally free from stresses due to compression or tension.

(6) The buoyant bodies or framework, being wholly submerged, is not subject to changes of buoyancy, but only to comparatively feeble stresses due to the dynamic thrust of the sub-surface waves. It does not, therefore, of itself impose any appreciable stresses upon the structure as a whole even in the roughest weather.

(7) Since the buoyant bodies of which the horizontally arranged portion of the submerged grid or frame is composed, comprise a large number of separate and identical cylindrical units and their corresponding buoyant junction boxes, and since all of these units, before the superstructure is erected upon them, float very lightly upon the water, they can be floated into position upon the surface of any sheet of sheltered water, and there bolted and braced together into a rigid framework, upon which, as a firm foundation, the whole superstructure can conveniently be erected. By this means the expense of building the structure in a shipyard and launching it therefrom is avoided.

I claim:

1. A floating structure, which is stable and substantially immobile in agitated water, comprising an assembly including a deck, a frame of evenly distributed buoyant bodies, a series of vertically arranged tubular bodies between said buoyant frame and said deck, and cylindrical stabilizing elements disposed in a vertical position on three points of said buoyant frame so as to project upwardly therefrom to the three corners of an imaginary triangle coinciding with the extremities of said deck, said assembly having a buoyancy whereby said deck is supported at a level above the crest of the greatest possible wave, said buoyant frame is wholly submerged at a level below the trough of the greatest wave and tends to sink on the passage of a wave crest, said tubular bodies are partly submerged and tend to rise at the passage of a wave crest, and said cylindrical elements are partly submerged, the latter having open lower ends extending down deeply into quiet water and being adapted to receive water up to about the normal water level, said buoyant frame and tubular bodies being so dimensioned that the sinking tendency of the frame is counterbalanced by the rising tendency of the tubular bodies.

2. A floating structure, as claimed in claim 1, in which the stabilizing cylindrical elements comprise a tapering portion disposed in the region of the water line.

3. A floating structure, as claimed in claim 1, in which said tubular bodies between said buoyant frame and said deck are double walled to form two concentric chambers one of which may be flooded.

4. A floating structure, as claimed in claim 1, comprising downwardly open cups at the lower ends of at least some of said tubular bodies, and means to force air into said cups to vary the buoyancy of the structure.

5. A floating structure, as claimed in claim 1, in which said buoyant body comprises a plurality of sections each having adjacent its end watertight bulk-heads and watertight doors in said bulk-heads, whereby each section floats and the structure may be assembled on still water.

FREDERICK GEORGE CREED.